United States Patent [19]
Subler et al.

[11] Patent Number: 5,646,992
[45] Date of Patent: Jul. 8, 1997

[54] ASSEMBLY, DISTRIBUTION, AND USE OF DIGITAL INFORMATION

[75] Inventors: Ronald J. Subler, Charlestown; Thomas Mark Hastings, Lexington, both of Mass.

[73] Assignee: Digital Delivery, Inc., Bedford, Mass.

[21] Appl. No.: 126,217

[22] Filed: Sep. 23, 1993

[51] Int. Cl.$^6$ .................................................. H04L 9/00
[52] U.S. Cl. .................................. 380/4; 380/9; 380/21; 380/23; 380/25; 380/49; 380/50
[58] Field of Search .................................. 380/3, 4, 5, 9, 380/10, 21, 23, 24, 25, 30, 49, 50, 63

[56] References Cited

U.S. PATENT DOCUMENTS

| | | | |
|---|---|---|---|
| 4,528,643 | 7/1985 | Freeny | 364/468 |
| 4,905,163 | 2/1990 | Garber et al. | 395/63 |
| 5,276,901 | 1/1994 | Howell et al. | 380/4 X |
| 5,319,705 | 6/1994 | Halter et al. | 380/4 |
| 5,412,717 | 5/1995 | Fischer | 380/4 |

Primary Examiner—Bernarr E. Gregory
Attorney, Agent, or Firm—Fish & Richardson P.C.

[57] ABSTRACT

Hierarchically organized graphical representations of items and groups of the items of digital information which are available to be ordered by a user are displayed. The user interactively explores the representations and selects items or groups to be ordered, using a pointer. While the graphical representations are being displayed, a list of items or groups which have been selected for inclusion in an order is also displayed. Software is executed which automatically determines the configuration of the computer, and matches the configuration with the stored configuration information prior to the user placing an order. A user may automatically be given access to items in a later revision of the medium if the user had access to the items in an earlier revision.

21 Claims, 15 Drawing Sheets

ASSEMBLY, DISTRIBUTION, AND USE OF DIGITAL INFORMATION

BACKGROUND OF THE INVENTION

This invention relates to assembly, distribution, and use of digital information.

Assembly, distribution, and use of information in digital form is fast becoming the norm rather than the exception to using "hard" copy. Virtually every kind of information may be treated in this way: sounds and music, executable programs, databases, pictures, animations, and fonts. The devices for embodying the digital information also vary widely. Examples include high-capacity storage media, like CD-ROMs, and switched telephone network communication.

In the case of CD-ROMs, publishers often already have available bundles of digital information which are being distributed in other modes (for example, on low-density diskettes). Because of the large capacity of CD-ROMs many bundles of digital information may be stored on a single disk. The bundles may be related, as in a set of different type fonts, or they may be unrelated. The publisher assembles the different bundles and creates a master data file which is then used to produce multiple identical disks for distribution.

A bundle stored on the CD-ROM may include not only the content which interests the end user (e.g., the text of an encyclopedia), but also executable programs which enable the user to find and make use of the content.

SUMMARY OF THE INVENTION

In general, in one aspect, the invention features a graphical user interface for aiding use of a group of items of digital information. Hierarchically organized graphical representations of the items and groups of the items which are available to be ordered by the user are displayed to the user. The user interactively explores the representations and selects items or groups to be ordered, using a pointer. While the graphical representations are being displayed, a list of items or groups which have been selected for inclusion in an order is also displayed.

Embodiments of the invention include the following features. The graphical user interface enables a user to preview additional detailed information concerning an item when a representation of an item is displayed, using a pointer. Also displayed are representations of actions which may be invoked, using a pointer, to cause an order to be effected and to enable a user to have access to an item that has been ordered.

In general, in another aspect, the invention features aiding a user in placing an order for access at a computer to an item of digital information offered by a distributor. Stored configuration information which identifies configurations of computers sufficient to enable use of the item is distributed to the user. Software is executed which automatically determines the configuration of the user's computer, and matches the computer configuration with the stored configuration information. A signal is issued to the user, prior to the user placing the order, if the configuration and the stored configuration information do not match.

Embodiments of the invention include the following features. The item of digital information is distributed on a high-capacity random access storage medium. The configuration information is also stored on the medium, as is the software which automatically determines the configuration and matches the computer configuration with the stored configuration information.

In general, in another aspect, the invention features enabling a publisher to control ordering of items of digital information by a user from among a larger set of items of digital information made available by the publisher. The publisher is enabled to store packaging information identifying packages of items which are available for ordering. The user is enabled to select packages for ordering and is prevented from ordering items in bundles other than packages included in the packaging information.

Embodiments of the invention include the following features. The bundles which the user is prevented from ordering include individual items and supersets of the packages. The items in the larger set are made available to the user as recorded information on a high-capacity random access storage medium. The packaging information is recorded on the same storage medium. At least one of the items may belong to more than one of the packages. The packaging information also defines packages of packages which are available for ordering.

In general, in another aspect, the invention features controlling access to a subset of items arbitrarily selected from among a larger set of items of digital information. Each of the items belonging to the set are encrypted using an encryption key which is unique among the items belonging to the set. A decryption key is provided which is sufficient to permit decryption of the items belonging to the arbitrarily selected subset of items.

Embodiments of the invention include the following features. The encryption keys are associated with corresponding decryption keys, which are themselves encrypted using a single global encryption key (the decryption key mentioned above) that is independent of the composition of the arbitrarily selected subset. A request by the user (e.g., an order) for access to the items belonging to the subset incorporates a request encryption key based on information unique to the request. The request encryption key has an associated request decryption key. The global decryption key is encrypted in accordance with the request encryption key and decrypted in accordance with the request decryption key. The information unique to the request comprises information associated with the computer. The larger set of items is recorded on a high-capacity random access storage medium and the decryption keys are also recorded on the medium. The decryption keys are encrypted prior to recording on the medium.

In general, in another aspect, the invention features restricting use of a decryption key for the purpose of decrypting an encrypted item stored on a high-capacity storage medium usable with more than one computer. The decryption key is encrypted using information which is unique to a single computer and later decrypted for use in the single computer to decrypt the encrypted item.

Embodiments of the invention include the following features. The information unique to the computer may include a network address or a computer serial number, or may be based on random information derived from the state of the computer system, or may incorporate a serial number of the storage medium. The information which is unique to a single computer may be delivered, from the computer to a location where the encrypting is done, as part of a request for access to the encrypted item.

In general, in another aspect, the invention features aiding a publisher in assembling items of digital information for mastering on a high-capacity random access storage medium by automatically verifying the existence and integrity of each of the items prior to assembly for mastering.

In general, in another aspect, the invention features enabling a publisher to control access to digital information items distributed to users in the form of successive revisions of a high-capacity random access storage medium. The digital information items are in encrypted form on the high-capacity random storage medium. A user is given access to selected ones of the items by providing decryption information suitable for decrypting the selected items, storing information indicative of items to which users had been given access in earlier revisions of the medium, and enabling a user automatically to have access to items in a later revision of the medium if the user had access to the items in an earlier revision.

Among the advantages of the invention are the following.

A wide range of benefits are provided by the invention both to the user and to the publisher. The publisher is provided with powerful tools both for marketing and for controlling access to items to be distributed. For marketing purposes, the publishers may include, e.g., on a CD-ROM, digital information implementing a wide range of marketing approaches, including previews of items, information describing the items, disabled versions of the items, and icons representing the items.

Publishers may easily maintain information regarding successive revisions of titles being distributed, and may arrange for users to have automatic access in later revisions to items that they paid for in earlier revisions.

The publisher can provide a large number and wide variety of items to a user, permitting the user to browse and preview the items, giving the user the opportunity to pick and pay for only those items of interest. The publisher need not fear that other items made available to the user, but not paid for, can be used.

The packaging of items in the system allows publishers to create item groupings that are sensible from a marketing or other viewpoint, and to present those groupings to the user as products. The product groupings can be revised and updated as needed.

The publisher can include the item grouping information and software for previewing, browsing, and ordering all on a single CD-ROM.

Prechecking the items during pre-mastering assures that the final CD-ROM will include the items intended and that they will be usable.

The user is provided with a powerful, easy-to-use interface to browse through and analyze the features of a wide range of items and product groupings, to pick and choose those which it wishes to order, to place the order, and then to install the items on his computer. This provides an easy and highly effective way to shop, not only for software, and databases, but for virtually any product.

For items which are to be loaded into and used on a local computer, the user can be assured, prior to placing an order, that the item will operate with the configuration represented by the local computer.

Giving access to multiple items via a single decryption key provided to the user when the order is accepted saves time and effort.

Other advantages and features will become apparent from the following description and from the claims.

DESCRIPTION

We first briefly describe the Figures.

Figure 1:
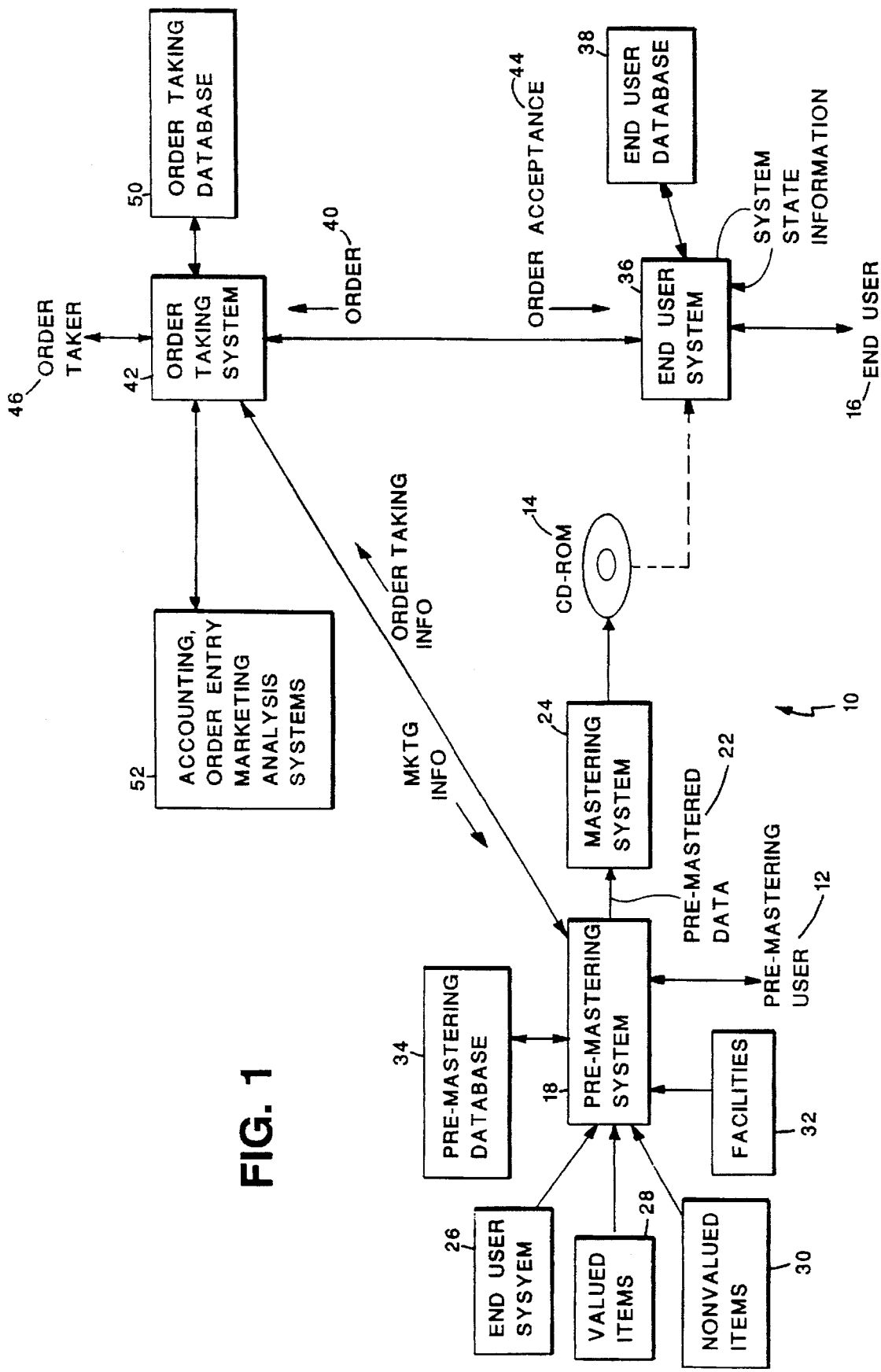
FIG. 1 is an overall block diagram of a computer-based system for assembling, distributing, and using digital information on a CD-ROM.

Referring to FIG. 1, in one example of the invention, a system 10 enables a publisher 12 to pre-master and distribute digital information on CD-ROMs 14, and an end user 16 easily to make use of the information.

Generally, the result of the publisher's work is a set of pre-mastered data 22 which is in form to permit mastering of multiple CD-ROMs 14 using a conventional mastering system 24. The pre-mastered data is set up by a pre-mastering system 18 which includes software running on a workstation. The inputs to the pre-mastering system 18 include end user system software 26, bundles of digital information 28, 30 (called valued and non-valued items, respectively), facilities 32 associated with the end user system software, and information entered by the user 12 using a keyboard or mouse (not shown). Valued items may be items which the user may order and pay for, such as clipart images. Non-valued items may be items which need not be paid for, such as free games, or marketing information describing a range of items. Among other things, the pre-mastering system checks and verifies the valued items 28 being included in the pre-mastering data set. The valued items are stored on the CD-ROM in encrypted form and are unusable by the end user until he has paid for their use. The pre-mastering system also maintains a pre-mastering database 34 which maintains information about the different sets of pre-mastered data 22.

The end user gets access to and makes use of digital information stored on the CD-ROM with the aid of end user system software 36. End user system software 36 is a version of the original end user system software 26 which has been configured by the pre-mastering system 18, combined with selected facilities 32, and stored on the CD-ROM. The software 36 is loaded into and runs on the user's workstation. Among other things, the end user system software creates and maintains an end user database 38, e.g., on the workstation hard disk.

The end user system software includes code which allows the user to browse through information representing the items, to preview certain items, to generate and send a purchase order 40 to an order taking system 42, to receive back an acknowledgment of the order, to "unlock" the order items, and to install them on the workstation.

The purchase order indicates which of the valued items (or groups of valued items) the user wishes to order. The order may also include information which is unique to the particular workstation being used and assures that the acknowledgment returned in response to the order will permit use of the items only on the particular workstation. The order may be delivered to the order taker under program control (e.g., via FAXmodem, modem, network packet, or cable system) or under user control (e.g., via voice telephone call, FAX, or printed matter)

Information stored on the CD-ROM with respect to a valued item includes information about which computers and peripheral equipment are suitable for use with the item.

Before an order is sent to the order taker, the end user system checks the actual configuration of the user's workstation against the stored compatibility information to make sure they match.

Once the order has been accepted, an order acceptance 44 is returned to the end user system. The order acceptance includes decryption information which is based on information previously sent from the end user system and aids in decryption of the valued items. The order acceptance also may include other information (for example control data for controlling the collection of information on user activity). The system is configured so that a single item of decryption information sent from the order taking system to the end user system is enough to allow decryption of whichever valued items are chosen by the user even though each valued item has been encrypted with a different encryption key and even though the order may specify an arbitrary selection of valued items.

The order taking system 42 includes software running on a workstation. The software provides an environment in which an order taker 46 can process the order and cause the order acceptance to be returned. The order taking system software maintains an order taking database 50. Information generated by the order taking system may be passed to accounting, order entry, and marketing analysis systems 52.

The end user system includes code which provides an integrated windowed graphical user interface through which users may browse, preview, order, unlock, and install valued items and other information stored on the CD-ROM.

The pre-mastering system enables the publisher to manage successive revisions of a CD-ROMs to permit, among other things, a user to have free access to revised versions of valued items which the user paid for via an earlier revision.

Pre-mastering System

Figure 2:
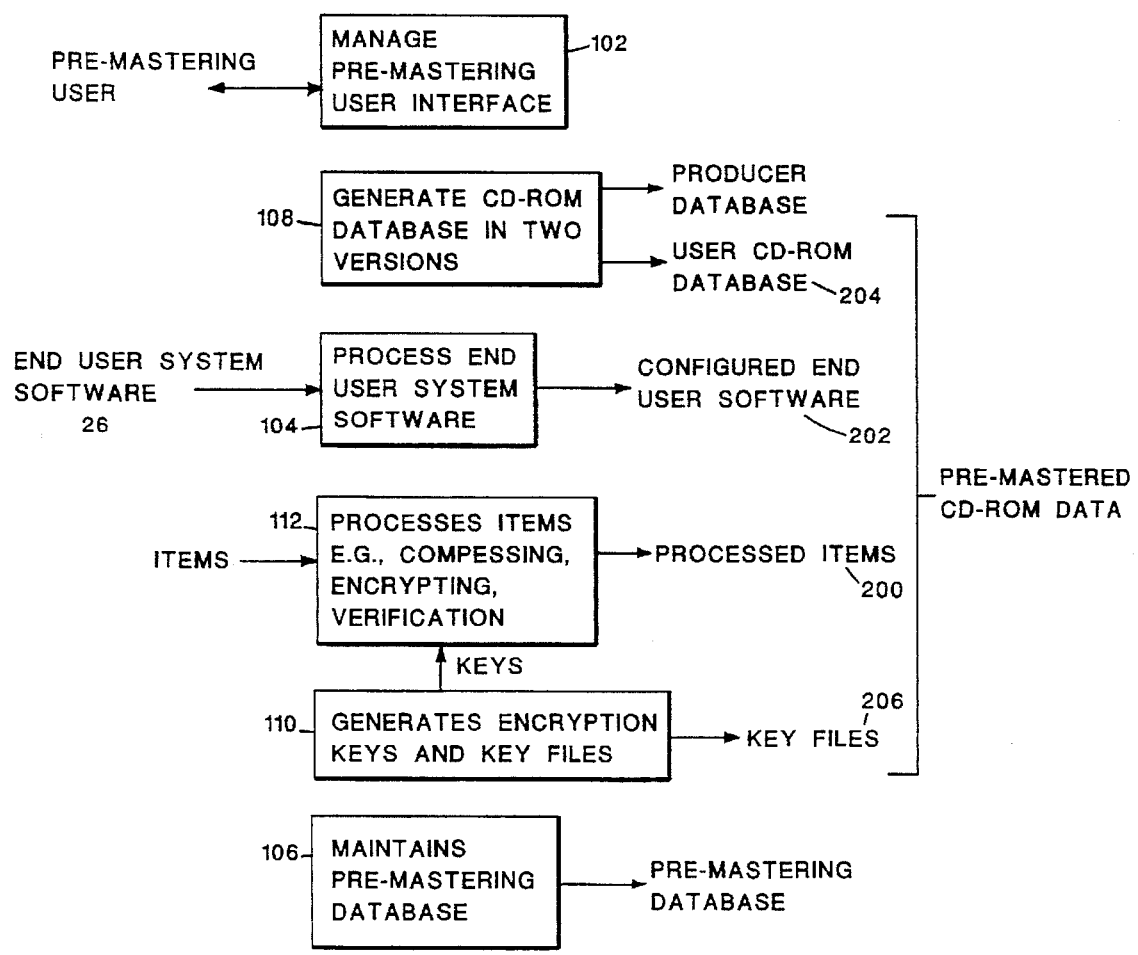
FIG. 2 is a block diagram of a computer-based system for pre-mastering a CD-ROM.

As seen in FIG. 2, the pre-mastering system manages the pre-mastering user interface 102. It provides a windowed graphical user interface which enables the user to guide the processing of the items to be included on the CD-ROM on an item by item basis.

Figure 27:
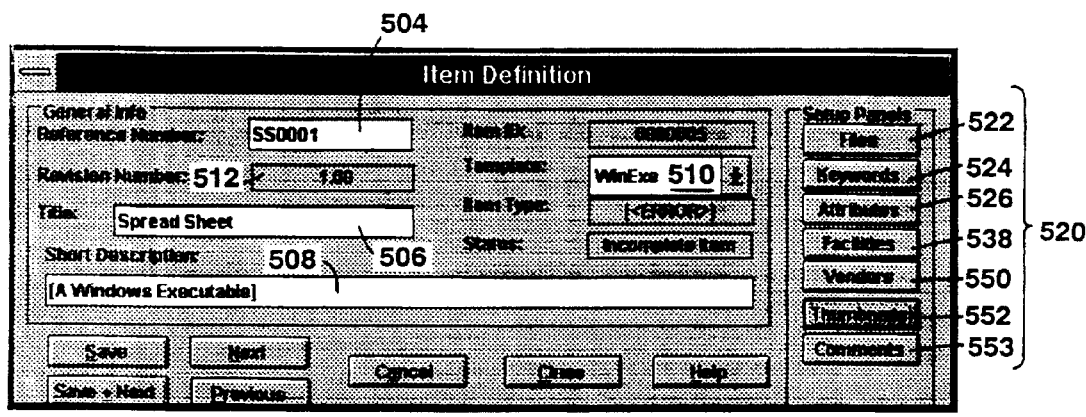
FIGS. 27 through 30 are views of displays shown to a pre-mastering user.

Referring to FIG. 27, an Item Definition window 502 offers the user the ability to define an item for use in pre-mastering an item efficiently. The user may enter a name for the item in box 504, a title for the item in box 506, and a short description in box 508. The software automatically provides a revision number in box 512 to maintain a sequenced record of item changes.

To initiate a new item, the user selects the New button on the item browser, and selects the type of item (e.g., atomic item or group item). The user enters a publisher ID which uniquely identifies the item for that title. The system automatically assigns an internal ID and revision number to the item. Other than type, internal ID, revision, number, and publisher ID, all other fields will initially have the value determined by inheritance as follows. If the field has a value in a title which this title is derived from, that value is used. Otherwise the value is marked as not specified. From the initial set of values, any further modifications to the item's fields may override the inherited values or cause them to be used again (to undo an override).

When an item is initially created, its status is set to incomplete. Once the item is validated, if sufficient information has been entered to allow a pressing the status is changed to complete. Once a pressing is performed using this item, the status is set to locked and no further changes are allowed to this revision of the item. A new revision must be created if edits are required. If a locked item is deleted its status is set to obsolete.

The item type box is a field which allows the user to select from a restricted list of item classifications used by the end user system.

Figure 28:
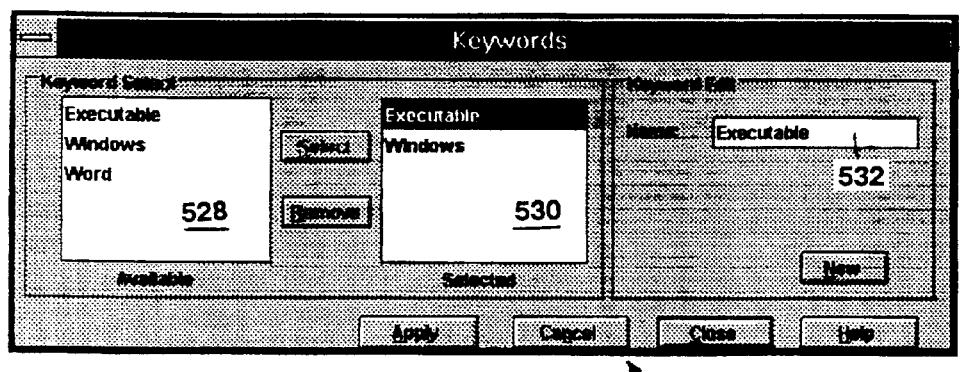

A set of buttons 520 allows the user to call up other windows to provide additional information for an item. The files button 522 invokes a window in which the user may indicate the source files that will make up an item. The keywords button 524 invokes a window 526 (FIG. 28) which contains a box 528 that displays available keywords for use with the item. A box 530 displays the list of keywords that have been selected from box 528 for use with this item. Box 532 provides a place for the user to edit a keyword selected in box 530. In general, the keywords applicable to an item may already exist; if so they may be imported by the pre-mastering system and displayed in box 528 for selection. Alternatively new keywords for the item may be keyed in by hand in box 532 to build a keyword set for the item.

Figure 29:
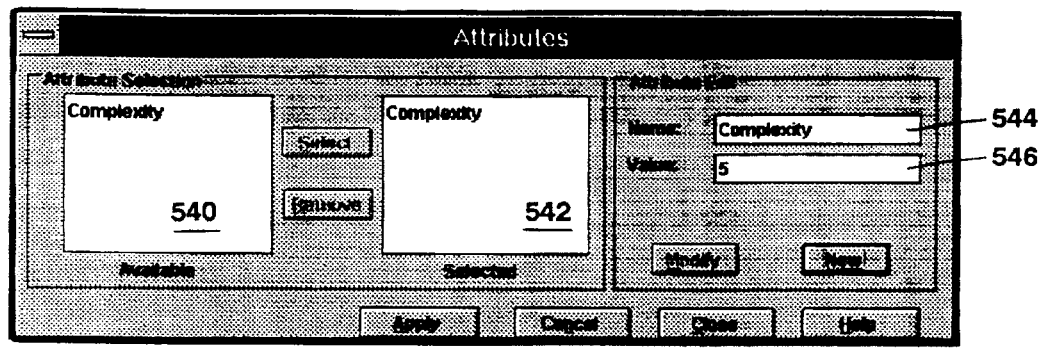

If the user selects Attributes button 534 (FIG. 27), he is presented with an Attributes window 536 (FIG. 29). Window 536 includes a box 540 which displays available attributes for selection by the user. In general, the attributes applicable to an item may already exist; if so they may be imported by the pre-mastering system. Alternatively new attributes for the item may be keyed in by hand to build an attribute set for the item. Box 542 displays the attributes that have been selected. Box 544 provides a place for the user to edit or add new attributes and box 546 enables the value of the attribute to be edited or added.

If the user selects the Facilities button 538 (FIG. 27), he is presented with a Facilities window that includes boxes enabling the user to select facilities that are to be made available for the item being premastered.

If the user selects the Vendors button 550, he is presented with a Vendors window that allows the entry of information about the vendor of the item.

Figure 30:
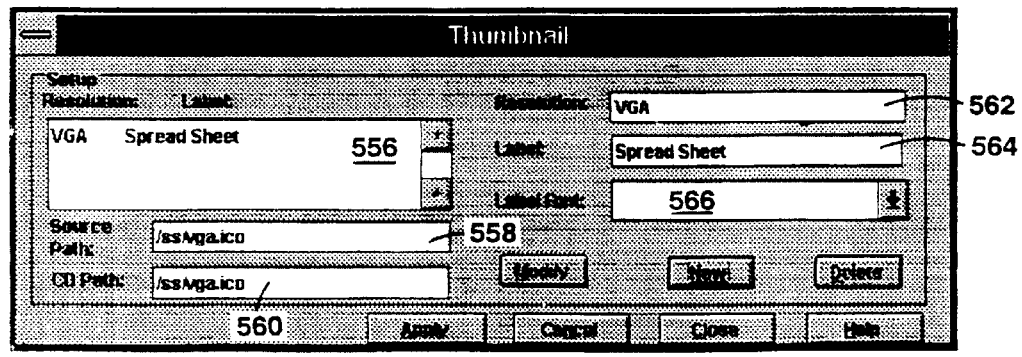

If the user selects the Thumbnails button 552, the user is presented with a Thumbnail window 554 (FIG. 30). A box 556 allows the selection of setup information for displaying the thumbnail associated with the item. The setup information includes a resolution, and a label for the spreadsheet. A box 558 enables the user to specify the source path of the file or files that make up the item. A box 560 enables the user to specify the destination path on the CD-ROM. The user may enter or edit resolution information in box 562, label information in box 564 and label font information in box 566.

In addition to providing a graphical user interface, the pre-mastering system processes end user system software 104 to place it in condition to be recorded on the CD-ROM. The pre-mastering system verifies and moves to the CD-ROM pre-mastering area all executable, library, and data files required by the end user system to be able to display, preview, order, decompress, decrypt, and install any items on the CD-ROM. The pre-mastering software also produces relations which map specific methods for each of the above facilities to each item on the CD-ROM. The pre-mastering software also generates all key tables required by the end user system as well as the order taker software.

The pre-mastering system maintains a pre-mastering database 106 that contains the following information with respect to each revision and pressing of each title:

date of the revision and pressing whether publisher has full rights or must pay royalty to manufacturer the title number
the revision number In the course of processing items for inclusion on the CD-ROM, the pre-mastering system creates a CD-ROM database 108 in two versions; one is held by the publisher (we shall call it the Publisher's Database); the other (a subset of the publisher's version) is included in the pre-mastered data to be stored on the CD-ROM (the CD-ROM Database).

CD-ROM Database

Figure 3:
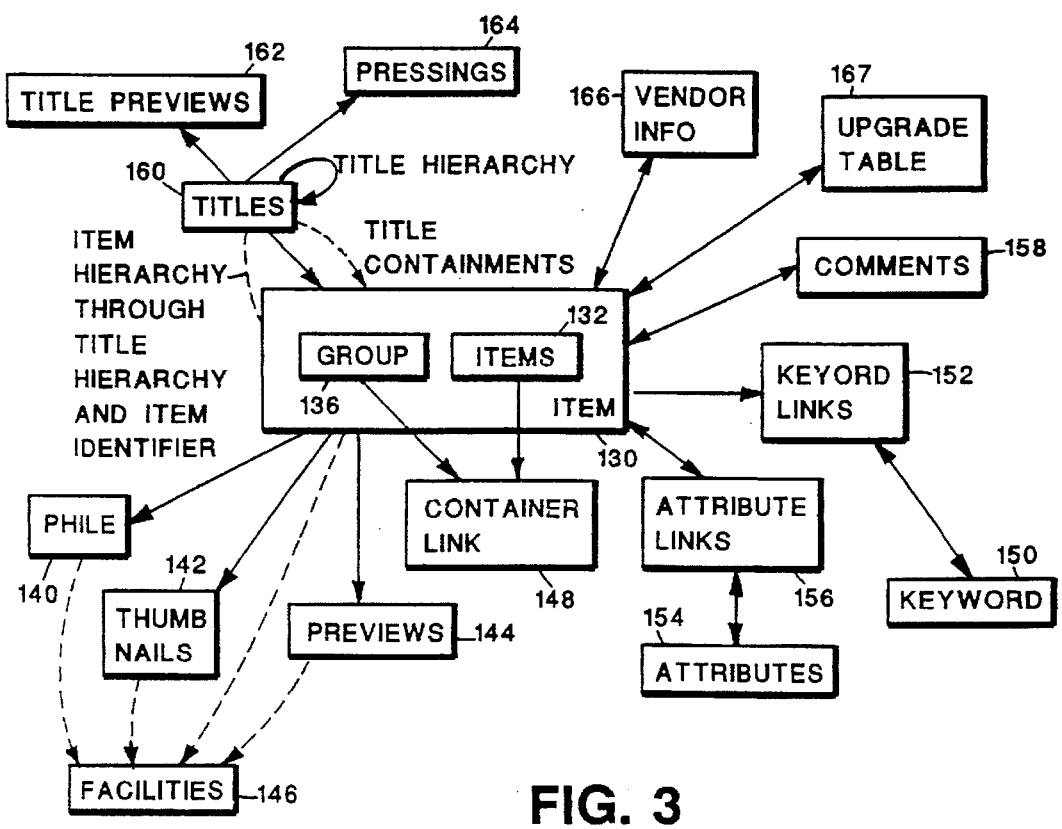
FIG. 3 is a block diagram of a database structure.

As seen in FIG. 3, both versions of the CD-ROM database are organized on an item by item basis. An item 130 may be an atomic item 132 or a group item 136 which represents a collection of items.

Each item is identified by an internal ID number, a vendor ID number, a publisher ID number, an original manufacturer ID number, a title for the item (for display at the end user's workstation), a description of the item, and a list of properties of the item. Properties associated with an item include original manufacturer
licensing rights due to manufacturer
whether the item is orderable or not
whether the item is valued or non-valued
whether the item is visible to the end user or not
comments
list fields, described below Each item has associated with it file information 140 for the files which make up the item. For each file, this includes where the file came from (its source path), where it is to be stored on the CD-ROM (its release path), where it is suggested that the file be installed on the user's system, the file size, a checksum, and a file type.

Each item also has associated with it information concerning one or more thumbnails 142 which are representative of the content of the item. An example of a thumbnail is a graphic of a single letter from an item which contains the entire font. Multiple thumbnails may be needed for use with different display modes (resolutions). The information concerning each thumbnail is its source path and its release path on the CD-ROM, a short title to appear under the thumbnail when displayed, font information for the short title, and identification of facilities needed to expose the thumbnail to the user.

Each item may also have associated with it one or more previews 144. Examples of previews are demonstrations, animations, copyright information, and bit maps. They are designed to enable a user to learn about an item without actually having access to the item. The information which both versions of the CD-ROM database hold with respect to previews for an item includes the identity of the primary preview and alternate previews, the files where the previews are located, the source path, the CD-ROM path, the title that appears on menus which give the user a choice of previews, and type of preview.

The container link information 148 defines relationships between atomic items and group items. An atomic item may be part of multiple packages, and packages may be linked in groups of items.

Each item may have an associated set of keywords 150 used for searching within the item. Because the same keywords may be used for more than one of the items, rather than tie a separate dedicated set of keywords to each item, keyword links 152 are provided to point to the keywords applicable to a given item.

In the same vein, an item may have attributes 154, but as multiple items may share attributes, attribute links 156 are provided to point to the attributes applicable to a given item.

Comments 158 may be entered with respect to an item, for documentation purposes.

For purposes of keeping track of sets of pre-mastered data, a set of items intended to be recorded on CD-ROMs is called a title. An example of a title would be images of major league baseball players. The properties of a title and of a revision include its name, its date, and comments. Titles may have title previews 162.

Titles are hierarchical in the sense that certain titles may be derived from other titles. In the case of title derivation, the derived title will inherit all the properties and items of the title from which it is derived. Any changes or additions to the derived title will only apply within its own scope. Subsequent changes to the title derived from will propagate to all derived titles dynamically.

Items are also hierarchical. An item within a particular title will inherit any unspecified properties from the corresponding items with the same identity (same internal ID) in any titles from which the particular title is derived. For example, if a title "Pictures of Cars" is derived from a title "Pictures of Machines" and one of the items contained in both titles is a picture of a Porsche then for all properties not specified for the "Pictures of Cars" title, the values specified for the same item in the "Pictures of Machines" title will be used. This mechanism allows specific properties only relevant to an individual title to be specified while not requiring general properties common to a group of titles to be re-entered.

When any change is made in a title, production of additional CD-ROMs represents a new revision. The CD-ROM database includes information which indicates which revision of the title is presented and indicates the upgradeability of each item. For a new revision, a new decryption key is generated for each item.

A given revision of a given title may have multiple pressings 164. A pressing is an instance of a title as it is recorded on multiple CD-ROMs which differs from the CD-ROMs of other pressings of the same title and revision only by the decryption keys associated with the respective valued items. The properties of a pressing include the date of pressing, a description of the pressing, and a seed for the encryption key. The seed is an encryption key used to encrypt the decryption keys generated for the first pressing of the given title and revision. A pressing could be a run of say 1000 CD-ROMs. In each new pressing, the encryption key and corresponding decryption key for the decryption key file is changed, but the underlying decryption keys for the items are not changed. This provides an additional security feature versus a system in which a pressing covers many thousands of CD-ROMs.

Upgrade tables 167 in the CD-ROM database indicate the extent to which an end user is permitted access to items to which he previously had access in an earlier revision. There is an upgrade table with respect to each prior revision or pressing. Each upgrade table includes a list of new item numbers. Each new item number is associated with an old item number and with a key. The key is the actual decryption key for use with the item on the current CD-ROM, encrypted with the original encryption key for that item on the revision or pressing to which the table pertains. Thus the tables, together with information previously obtained by the end user with respect to the earlier pressing or revision, is sufficient to permit decryption of items to which the user previously had access.

The version of the CD-ROM database recorded on the CD-ROM is identical to the publisher's version except that it only includes the one title which relates to the items stored on the CD-ROM and all hierarchical information has been resolved to produce a single independent set of records.

In addition to the general title information and the information concerning each item in the title, the CD-ROM database includes vendor information, keyword information, and attribute information which are referenced by items in the title.

An example of a possible database definition for the CD-ROM database is set forth in Appendix A, incorporated by reference.

Returning to FIG. 2, the pre-mastering system also generates encryption keys and key files for use for a given pressing. The encryption scheme is described in more detail below.

The pre-mastering system also processes 112 the original items to generate processed items. This is done after the CD-ROM database has been set up and the encryption keys and key files have been generated. The title information in the database indicates the items to be included in the pre-mastering data. Items to be included are processed one after another. To process an item, first the files which make up and which are associated with the item are located and fetched.

Each file is verified by the following steps. A check is made to be sure the file exists and is the same version as the one that the user originally specified when populating the database. This check is made on the basis of size, checksum, and modification date. A check is also made that the item includes (and has accessible) all required fields (for example, bitmaps may always require an x-size and a y-size).

After verification, the files making up the item are compressed (if called for) and encrypted (if called for). Compression and encryption may use any appropriate compression and encryption schemes. The files making up the item are compressed and/or encrypted if the database so indicates (which will be typical for large items, to be compressed, or valued items, to be encrypted).

Figure 4:
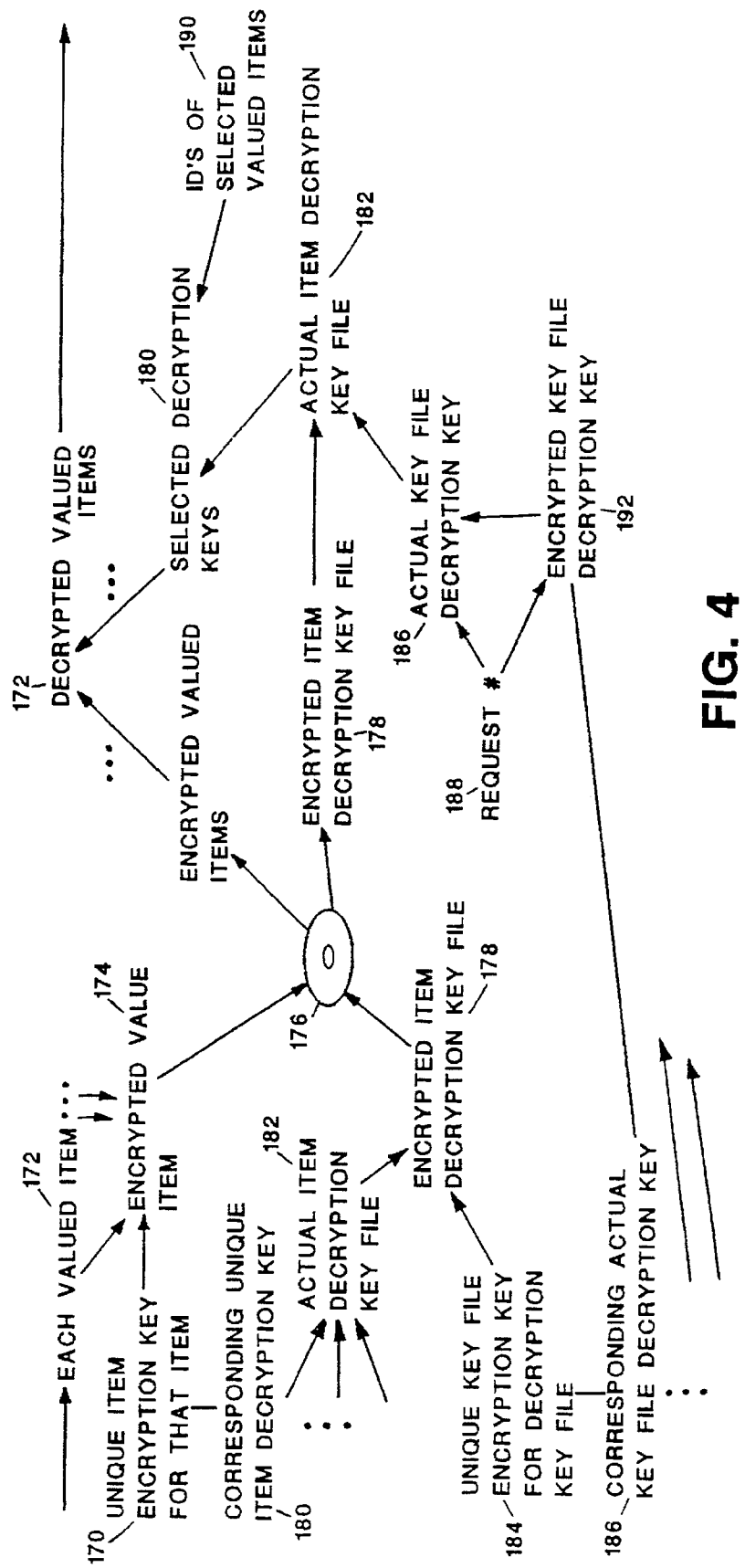
FIG. 4 is a flow diagram of an encryption/decryption process.

Referring to FIG. 4, the sequence of steps involved in encryption and decryption of an item in the pre-mastering, order taking, and end user systems begins with the generation of a unique item encryption key for the item 170. Encryption keys may be generated by any of a variety of known schemes. The unique item encryption key 170 is applied to the valued item 172 to generate an encrypted valued item 174. It is that encrypted item that is recorded on the CD-ROM 176. The CD-ROM may carry an encrypted version of an item decryption key file 178. The encrypted item decryption key file is an encrypted file which lists the encrypted items on the disk and associates with each item an item decryption key 180 which corresponds to the item encryption key used to encrypt the file. The actual item decryption key file 182 is encrypted using a unique key file encryption key 184. Thus, the CD-ROM contains all of the decryption keys needed to decrypt all of the items contained on it, but they cannot be used without decrypting the file which holds them. That decryption requires an actual key file decryption key 186 which corresponds to the key file encryption key for decryption key file. The actual key file decryption key is not included on the CD-ROM but rather is obtained by the end user as part of the process of ordering and paying for use of selected valued items, as follows.

The actual key file decryption keys are provided by the publisher to the order taker and maintained in the order taking system. Each order from an end user to the order taker includes a unique request number 188 and a list of IDs of selected valued items 190. The request number identifies the CD-ROM in a way that enables the order taking system to fetch the actual key file decryption key. The order taking system uses the request number to generate an encrypted key file decryption key 192 which is delivered to the end user system. The end user system has access to the request number in that the request number was generated at the end user workstation. The end user system uses the request number to decrypt the encrypted key file decryption key 192, thus recovering the actual key file decryption key 186. This is used to generate (unlock) the actual item decryption key file 182 from the encrypted version 178. Then the IDs for the selected valued items 190 are used to control the retrieval of the selected decryption keys. They are stored on the hard disk of the end user's workstation and used to decrypt the valued items for subsequent use. Alternatively they may be stored on a network file server (for example, when an enterprise license or bulk license and software for counting active copies is used) or on other media such as Flash RAM, EEPROM (EEROM) or even ROM (for example when the key is pre-encoded in a PCMCIA card).

Part of the key file decryption key is a set of check sum/hash totals on the item decryption keys for the items in the order. This provides an additional layer of protection, making it more difficult for the end user to use the key file decryption key to free up item decryption keys for items not ordered.

Referring again to FIG. 2, the finished CD-ROM contains processed items 200 (which include valued items and information other than valued items, e.g., marketing materials), configured end user executables 202, the end user CD-ROM database and the key files 206.

The system may be used to distribute a title which spans multiple volumes (e.g., multiple physical CD-ROMs). The CD-ROM database is then duplicated on each of the volumes and the thumbnails and selected non-valued items may be duplicated on some or all of the CD-ROMs. The database includes volume number as an identifier so that the end user system will not be confused as to which physical volume is currently in place. As a result, the publisher may virtually ignore size constraints and the user may compose an order which spans several volumes.

End User System

Figure 5:
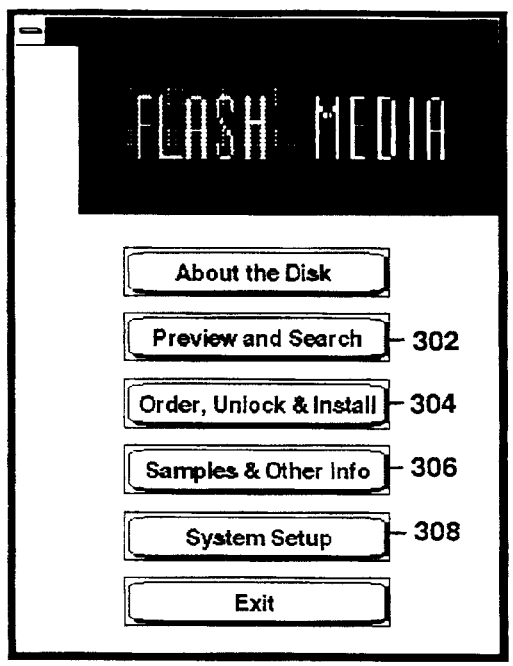
FIGS. 5 through 25 are views of displays shown to an end user.

When the user starts the end user system, the main menu (FIG. 5) appears. Among the menu choices are Preview and Search 302 (which leads to the main browsing and searching facilities); Order, Unlock, and Install 304, which leads to the processes for generating orders, and unlocking and installing items; Samples and Other Info 306, which provides the same functions as Preview and Search, for free product and general information; and System Setup 308, where users can review and modify information about themselves, their system, and the publisher.

Figure 6:
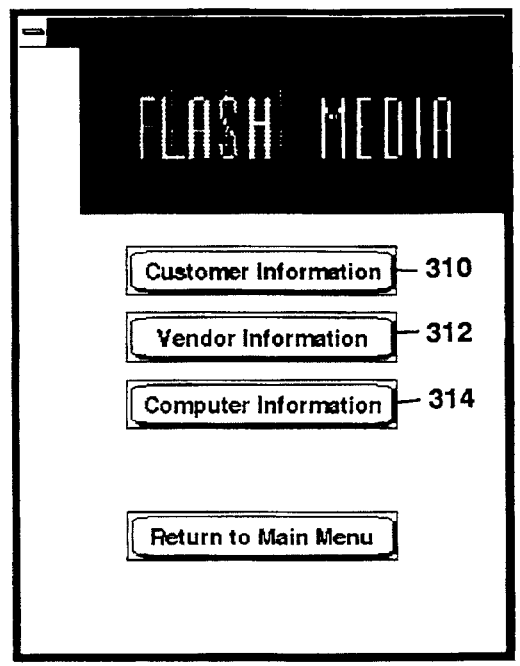

When the user invokes the System Setup item, the submenu of FIG. 6 appears. The Customer Information selection 310 leads to a window of information about the end user which is needed when an order is to be placed. The Vendor Information selection 312 leads to information about the name, address, phone, FAX, customer support technical support and related numbers from the publisher. The Computer Information selection 314 provides system configuration information needed to run the end user system, such as the location of the CD-ROM reader.

Figure 7:
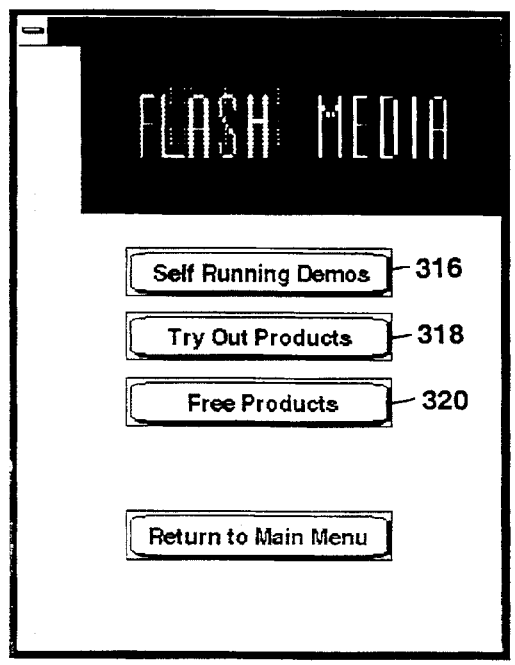

The Samples and Other Info selection 306 on the main menu gives the user access (through a sub-menu (FIG. 7) to self-running demos 316, try-out (disabled) products 318 or free products 320.

Figure 8:
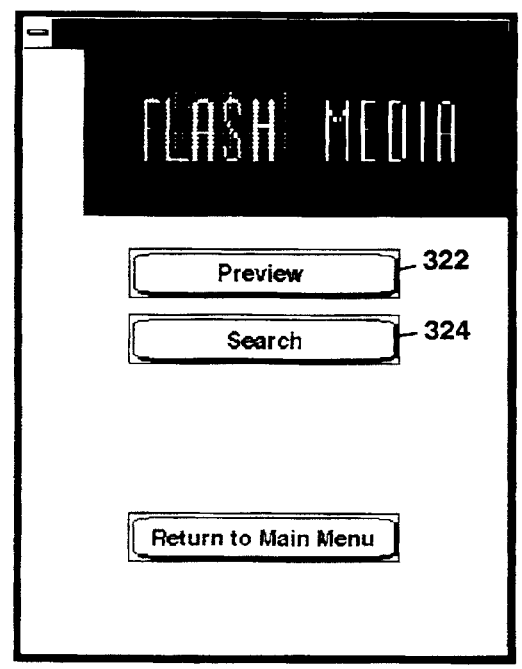

The Preview and Search selection 302 of the main menu gives the user access (through a sub-menu, FIG. 8) to alternative choices for previewing 322 or searching 324 through items on the disk for the purpose of locating those which the end user wishes to purchase. The search functions are a subset of the preview functions described below.

Figure 9:
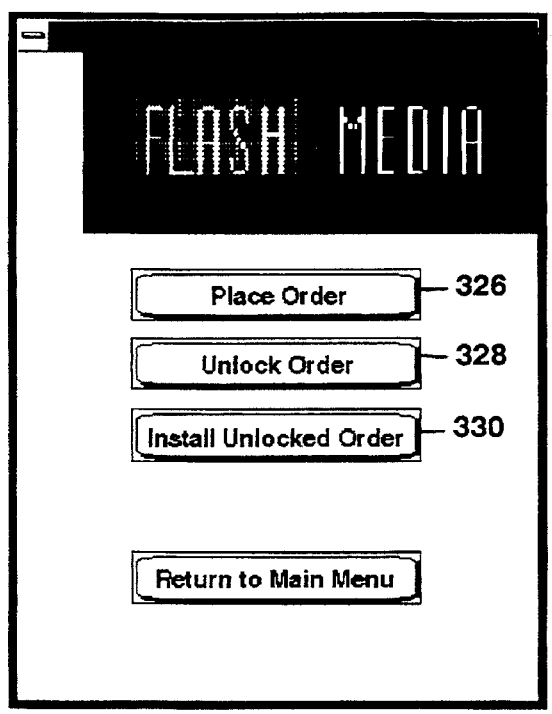

The Order, Unlock, and Install selection 304 of the main menu leads to a sub-menu (FIG. 9) which enables the user to Place Order 326, Unlock Order 328, or Install Unlocked Order 330.

When the Preview selection 322 is invoked, a multiple window screen 332 (FIG. 10) appears. The screen provides constant simultaneous viewing of three important aspects of the content of the CD-ROM and makes navigation, previewing, and ordering or items easy and simple. The three aspects are displayed in three windows. The Viewer window 334 continually provides graphical illustrations 336 of one or more items stored in the CD-ROM. The user may use the scroll bar 338 to navigate through the items which to finds ones of interest.

The Position window 340 illustrates the hierarchy of the items on the CD-ROM and the position of each item, or category, or package within the hierarchy. The hierarchy does not depend on the physical location of the items on the CD-ROM but rather is governed by a marketing hierarchy imposed by the publisher in the course of pre-mastering and embodied in the CD-ROM database. The scroll bar 342 permits easy navigation through the hierarchy and the Position and Viewer windows are synchronized so that scrolling in one causes corresponding scrolling in the other.

An Order Pad window 344 gives the user access to the ordering facilities and displays information about orders.

The lowest level in the hierarchy of items illustrated in the Viewer and Position windows are the items. Items (e.g., individual clipart images) may be bundled into packages for purposes of sale. Each package typically contains items of a broader category (e.g., sound effects), and there are typically different packages within a given category. Categories typically are not subject to being purchased in a single transaction. Only the packages within a category may be purchased in a single transaction. There may be packages of packages and so on. Furthermore packages may contain items of different types.

The user may easily switch what is shown in the Viewer window between all of the items stored on the CD-ROM (using the disk contents button 345) and the items which were generated in the most recent search (using the search results button 347).

The type of each thumbnail is indicated in the upper right corner, for example by a "C" 350 for Category, or by a "P" for package, or blank for an individual item. At the lower right corner of each thumbnail is an indication of whether the item or package has been ordered (a "?"), ordered and unlocked (a checkmark), ordered, unlocked, and installed (filled circle) or not yet ordered (blank). The status indicator for a package or group indicates the highest level of status achieved by all items in the package or group.

Each thumbnail is accompanied by an textual title 354 which includes one line of content and a second line repeating in text what is indicated in the hierarchical symbol 350. Initially the Viewer displays thumbnails 346 of the highest level bundles in the hierarchy, in this case categories.

Figure 11:
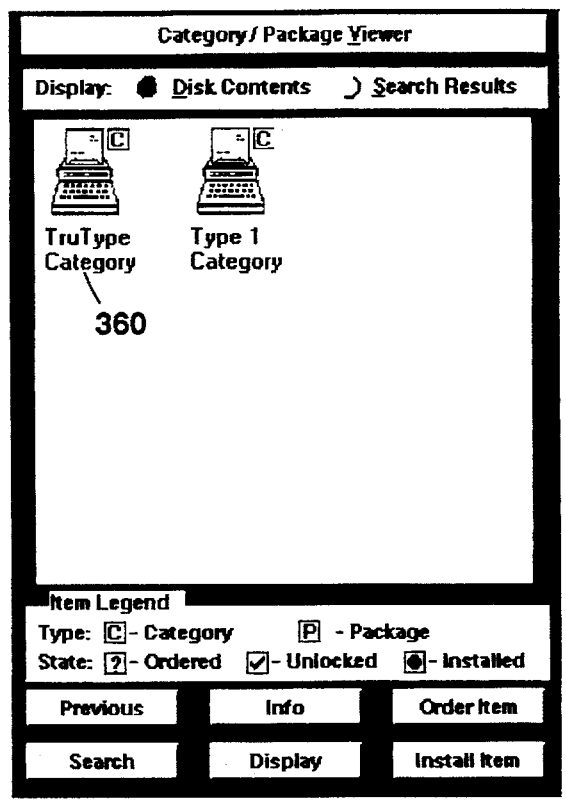

When the user double clicks on a category thumbnail, the category is opened to reveal thumbnails 360 (FIG. 11) corresponding to all of the entries at the next lower level of the item hierarchy. As shown, this next lower level may itself include categories.

Figure 12:
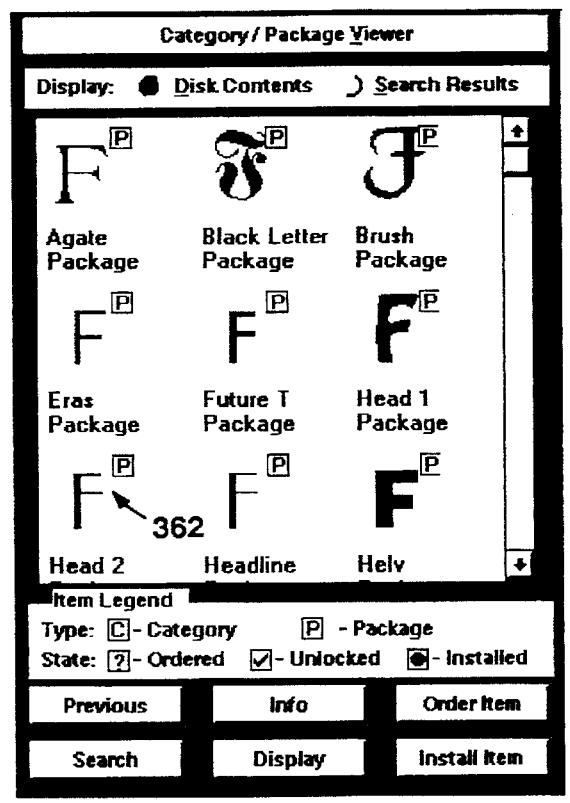

Double clicking on one of the thumbnails at this lower level (e.g., the "Type 1 Category") opens that category and displays package thumbnails 362 (FIG. 12). In this case, each thumbnail is a sample of one of the font letters. Clicking on one of the package thumbnails leads to display (in this case) of the thumbnails 364 (FIG. 13) for individual items (here individual fonts).

The hierarchy may be navigated in the reverse direction simply by clicking on the Previous button 366.

Figure 14:
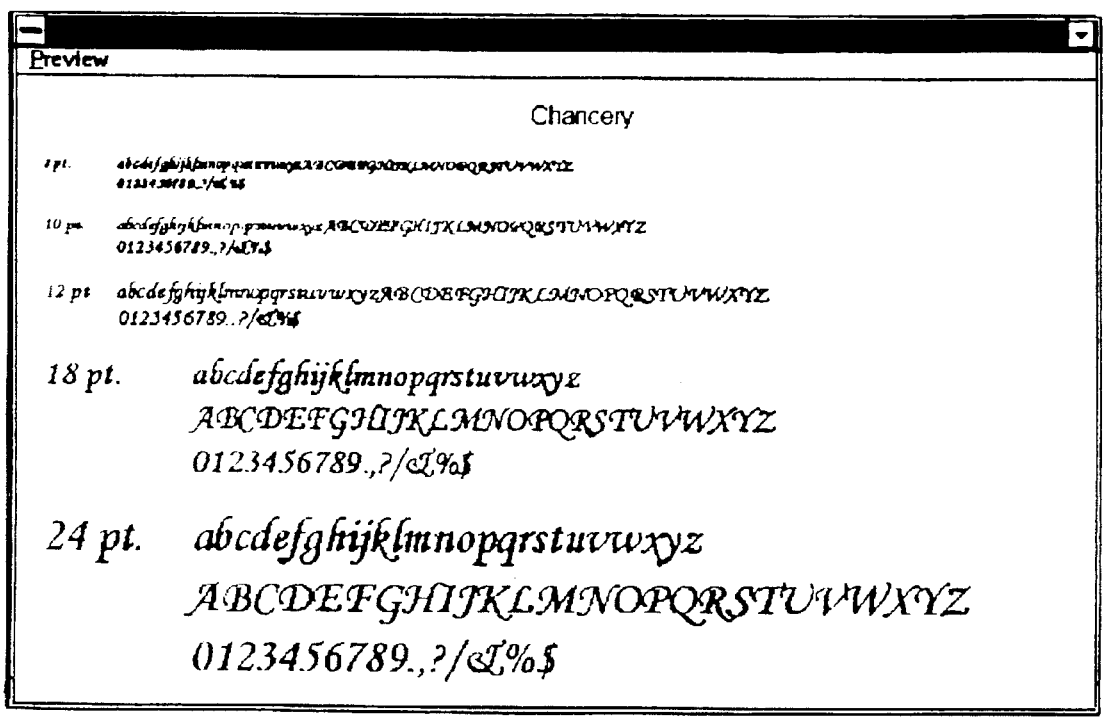

By clicking an individual item thumbnail, the user may cause display of additional information about that item (for example more comprehensive displays of the font (FIG. 14)).

Figure 15:
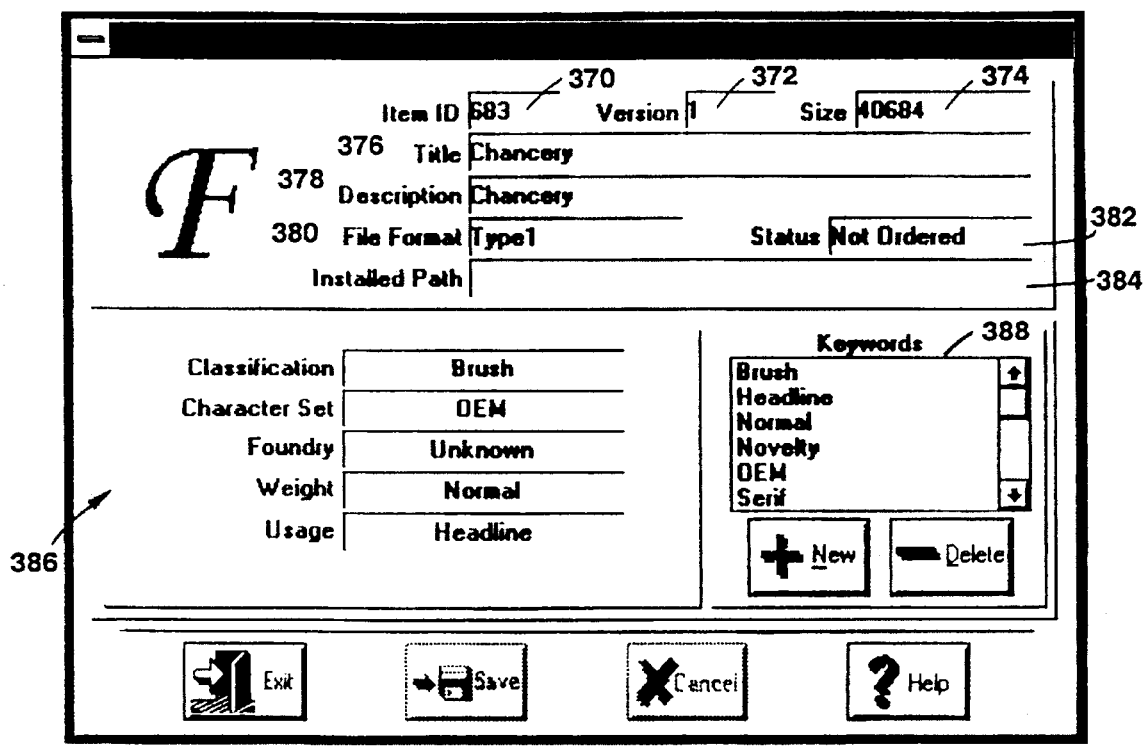

Clicking on the Info button 368 (FIG. 13) provides other detailed marketing information (FIG. 15) about items represented by selected thumbnails.

The information for every item includes the item identifying number 370, the version number 372, the size 374, the title 376, a description 378, a file format 380, the status 382, and the installed path 384. Of these items all but the last two are derived from the CD-ROM database. The last two are derived from the end user database.

The middle of the window provides information 386 (derived from the CD-ROM database) specific to the particular type of item. The keywords subwindow 388 shows keywords assigned to the item (either by the publisher via the CD-ROM database, or by the end user).

The end user may click the order item button 390 (FIG. 13) at any time to add a selected item to an order, and may click the install item button 392 at any time to install a selected item that has been ordered and unlocked.

Thus the windowed graphical user interface enables the user to engage in browsing, previewing, ordering, searching, and installation activities easily and quickly while viewing and interacting with a single screen of three windows and control buttons.

SEARCHING/BROWSING

The end user may search the content of the CD-ROM using keyword information and the values of attributes. Keyword information may be stored on the CD-ROM as part of the CD-ROM database, as a result of pre-mastering, or may be added by the end user and stored in the end user database. Attribute information is supplied by the publisher in the course of pre-mastering and stored in the CD-ROM database. Attributes are publisher specified information categories which apply to all items of a given type. The attribute values for an item appear in the window that is displayed when the info button is clicked (reference numeral 386 in FIG. 15.

Figure 13:
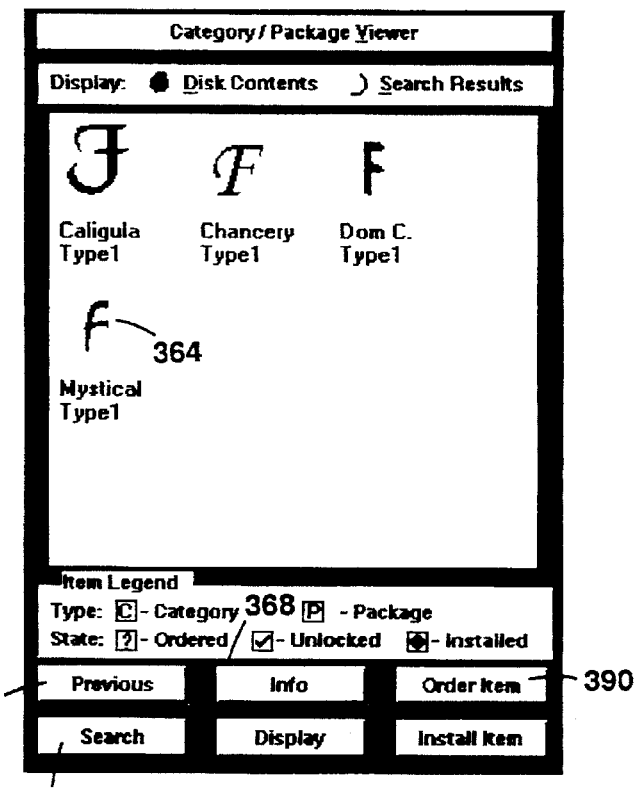

The end user invokes the search function by clicking on the Search button 390 (FIG. 13). When the search is completed the results are represented by thumbnails displayed in the Viewer window. The Search is replaced with a Search Again button. When the search again button is pressed searching is restricted to the field of results of the prior search.

Figure 16:
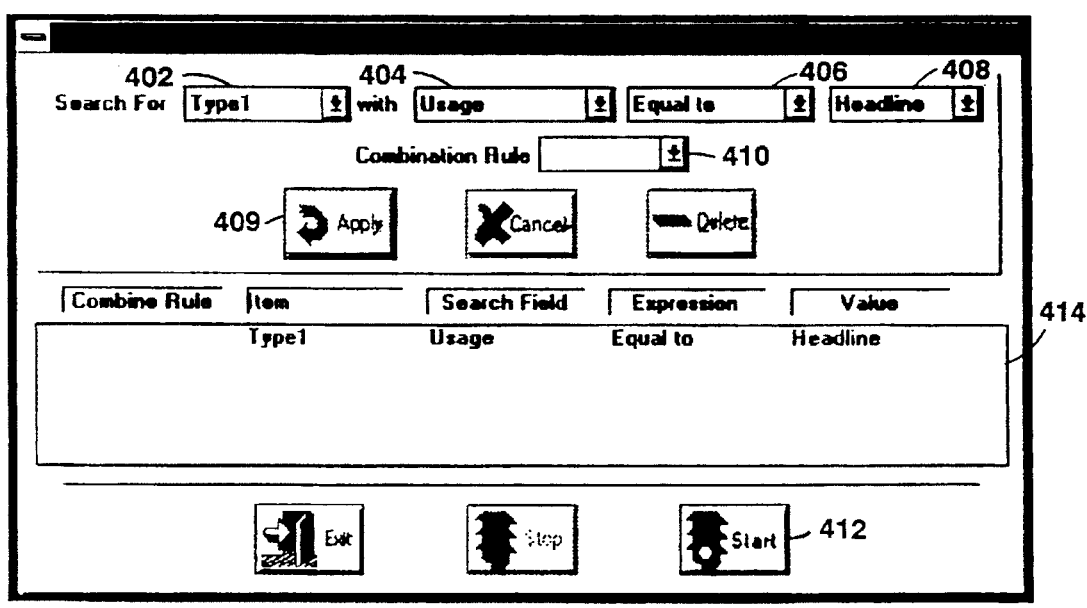

When the Search button is clicked, a window 400 (FIG. 16) is displayed enabling the user to specify the search criteria and control the progress of the search. At the top of the window are four pull down menus. The first pull down menu 402 permits selection from all of the groups of items recorded on the CD-ROM. The second pull down menu 404 permits selection from a list of all of the attributes defined for the selected group. The third pull down menu 406 permits selection of a logical search operator (e.g., greater than). The fourth pull down menu 408 permits selection of one of the possible values which exist for the selections made in the other three pull down menus.

If the user wishes to apply a combination search, he then clicks on the Apply button 409. Then he selects a combinational operator in the Combination Rule pull down menu 410. And then he enters the next search rule in the menus 402, 404, 406, 408, and finally clicks on the Start button 412. The search criteria are displayed in box 414 for review. The Where is it function (described below) may also be used to locate a desired item.

Being able to locate a desired item is especially useful at the end of the searching process. The search may have led to items which are individually not orderable (so that the user needs to find the package which contains the item and which is orderable) or to items which are orderable in multiple packages (so that the user needs to determine which package is most suitable to order).

Ordering

The end user uses the Order Pad window 344 (FIG. 10) to compose a new order, place an order, review an order that has been composed or an order that has been placed, to unlock the items of an order that has been placed and accepted, and to install the items of an order that has been unlocked.

Figure 10:
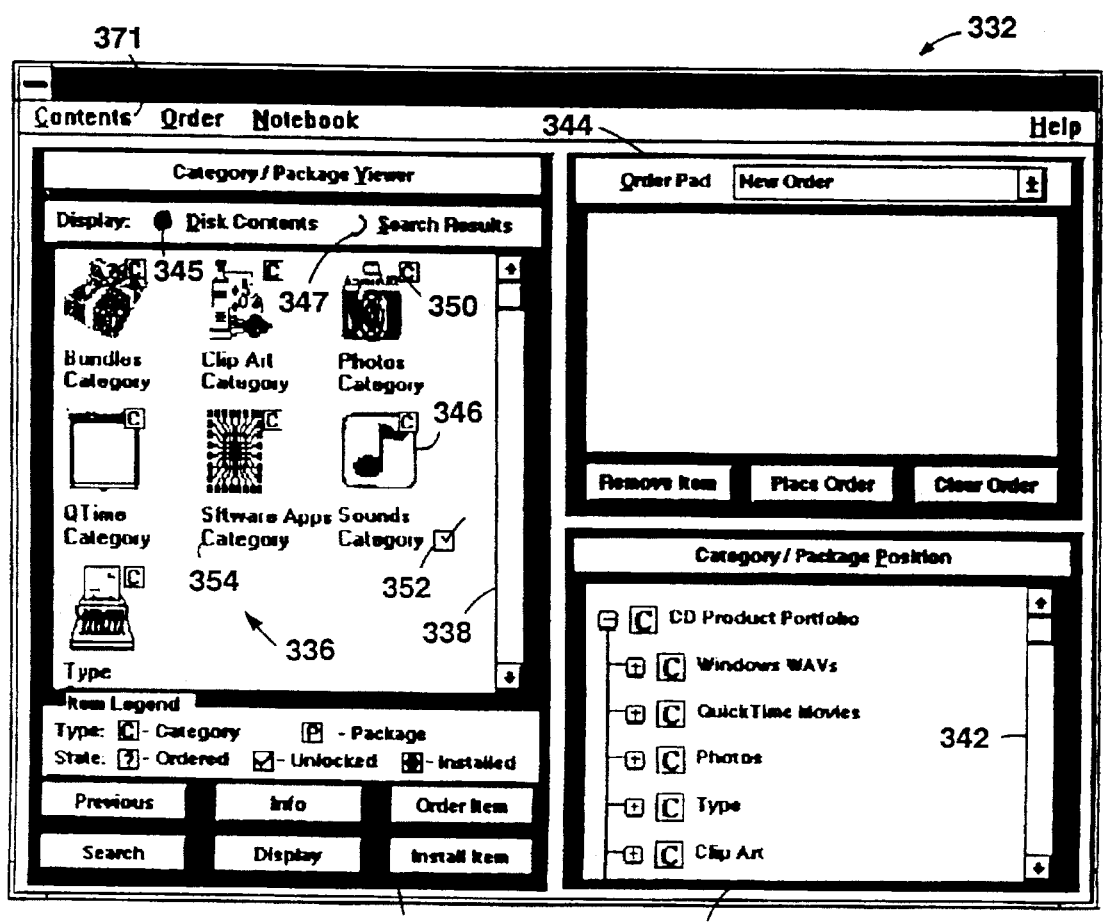
Figure 24:
Figure 25:
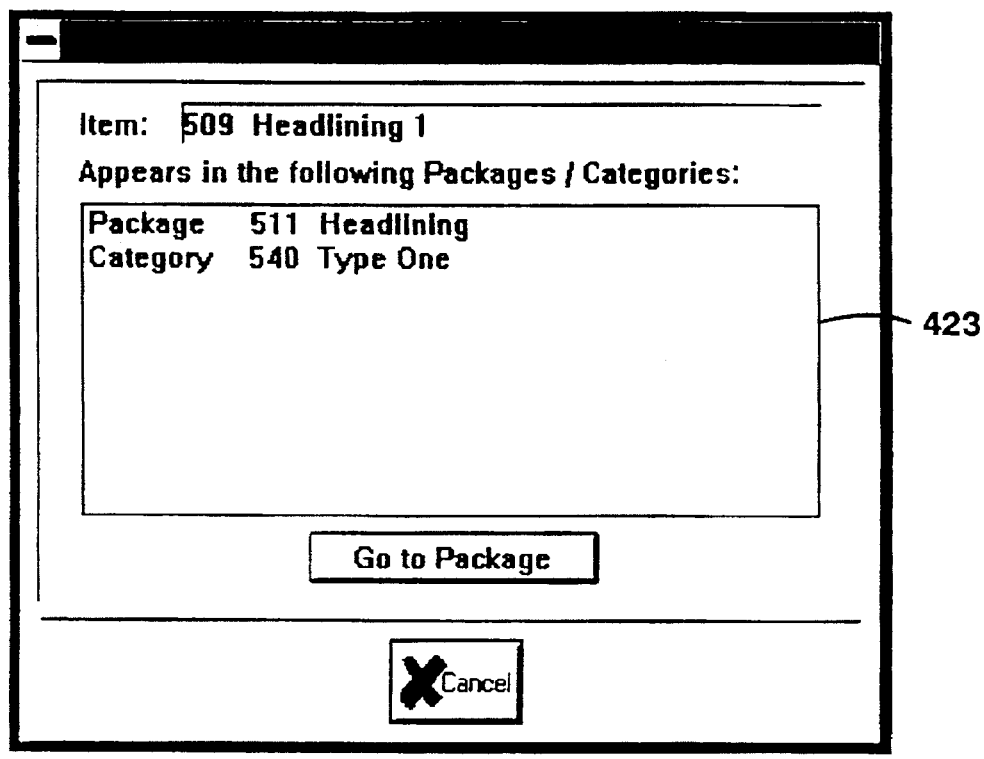
Figure 26:
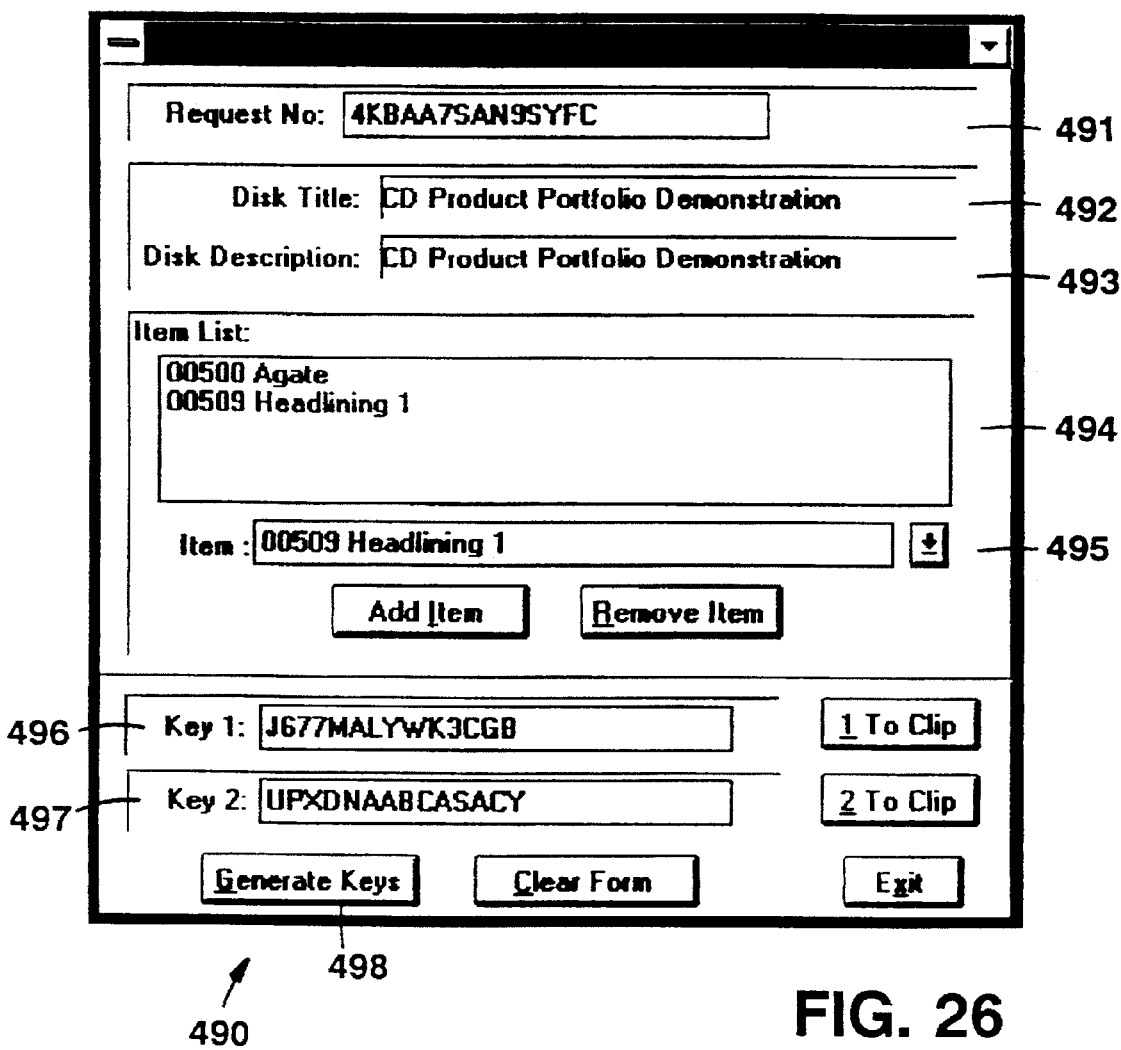
FIG. 26 is a view of a display shown to an order taker.

An order is composed by assembling in the Order Pad window a list of orderable items, packages, and categories. The list is assembled in any one or more of three ways. One way is to drag and drop the entity from the Viewer window. A second way is to select the item in the Viewer window and then click on the Order Item button (390, FIG. 3). A third way is to select the item in the Viewer window and then select Add to Order from the Contents pull down menu 391 (FIG. 10). The Contents pull down menu is shown in FIG. 24. As seen in FIG. 25, when the Where is it entry 421 is selected in the Contents pull down menu, a list is displayed showing the packages and categories in which the selected item is found. This aids the user in deciding which package may be the best to buy to get the desired item.

Returning to FIG. 10, the entities which make up the order are listed 420 in the order pad window in the same order as in the Position Window and may be expanded or contracted in the same way.

Figure 18:
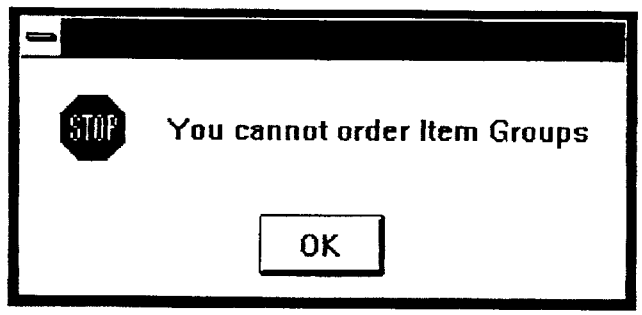
Figure 19:
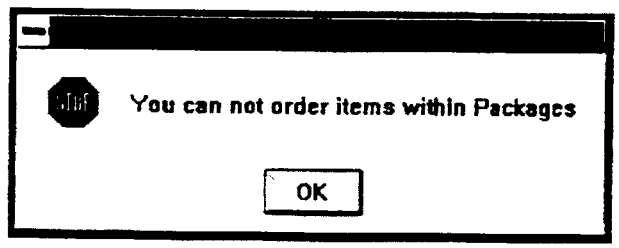

If an attempt is made to order a collection of items that was not intended by the publisher to be sold as an entity, an error message like the one shown in FIG. 18 is displayed. A similar error message (FIG. 19) is displayed when the user attempts to order an item which is too low in the hierarchy to be separately ordered.

If the user double clicks on an entry in the list displayed in the Order Pad window, thumbnails of the items which make up the entry are displayed in the Viewer window.

Figure 17:
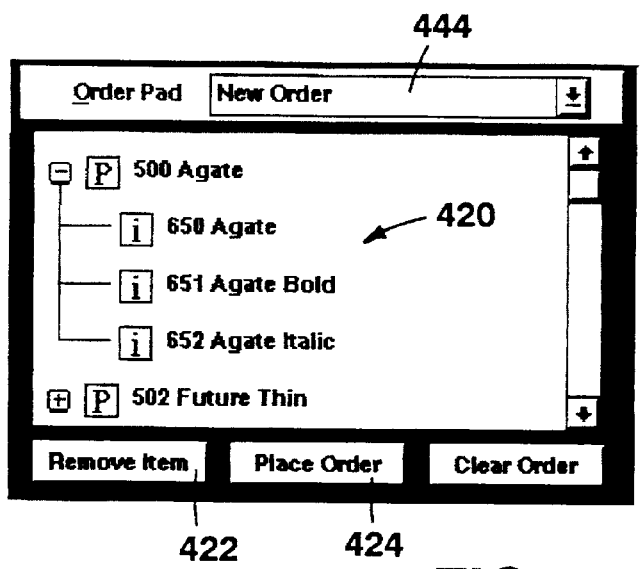

The user deletes an entry from the order list by selecting it and then clicking on the Remove Item button 422 (FIG. 17).

To move on to the process for placing the order, the user clicks on the Place Order button 424 (FIG. 17). The Clear Order button deletes the entire order list from the window.

Clicking on the Place Order button causes a order information window 426 (FIG. 20) to be displayed. Sections at the top of the window show the customer number (received from the order taker and entered after the first order is placed), and the customer name, company name, voice and FAX phone numbers, and disk serial number (all entered by the user during setup and subject to change by clicking on the Set Up button 428). The disk title is automatically provided from the CD-ROM database. The request number is generated by the end user system as described earlier and is unique to the order. This may be achieved either using the serial number or network address of the computer on which the end user system is running or by using randomized information (e.g., information derived from the state of the computer system) that makes it highly unlikely that two requests will be the same. In some implementations the request number can incorporate a disk serial number. Information about payment 430 is user editable by clicking on the Set Up button. Ordering information 432 is also editable through the Set Up procedures.

The Cancel button 436 removes the order from the system and returns the user to the Viewer. A placed order may be saved by clicking on the Save button 438. Clicking on the Unlock Order button 440 advances the user to the unlock and install routines after the order has been placed and the key has been returned. The Help button 442 does what its name implies.

The user may view, unlock, and install orders previously composed using the scroll bar 444 (FIG. 17). When the user clicks on an order shown in the scroll bar list, that order is displayed in the Order Pad window. That order may then be viewed or unlocked.

The ordering may be done by several methods. In a telephone conversation the user may read the information to a clerk and receive back the decryption key. In a FAX order the information and key are passed by in FAX format. In a printed order the order and key are printed on paper and the papers are FAXed. Modem to modem communication is also possible. The purchased item list is not editable (because it is permanently associated with the request number) and is copied from the list in the Order Pad window.

Unlocking

Figure 20:
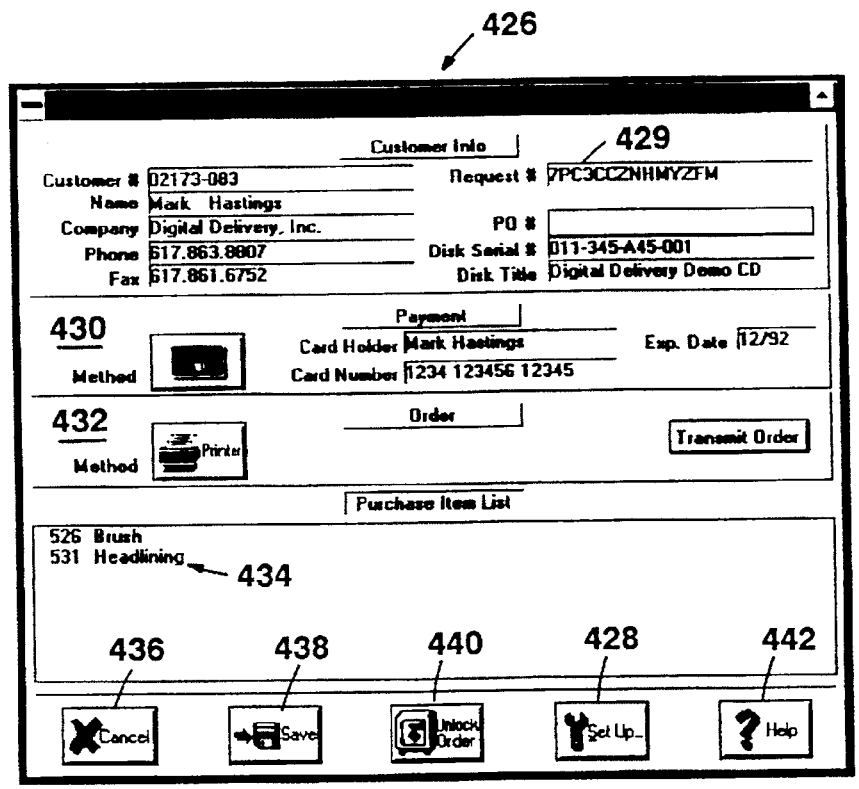
Figure 21:
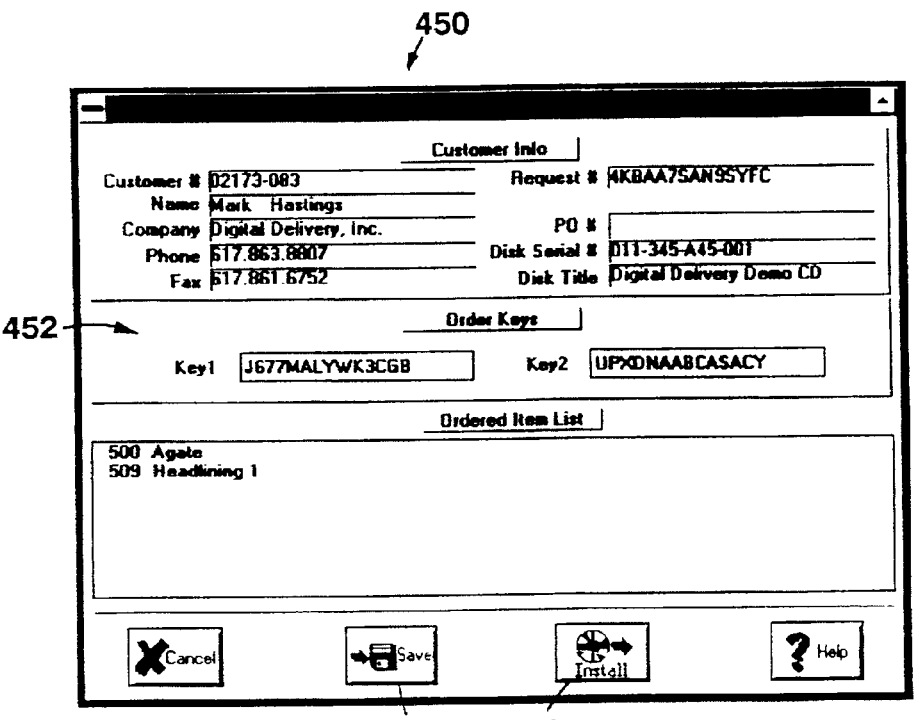

When an order has been placed and the decryption keys have been returned, the user enters the keys in the Unlock Order window 450 (FIG. 21) which is displayed by clicking on the unlock button 440 (FIG. 20). Alternatively the user may select an entry in the Order pull-down menu. The user enters the keys in the key fields 452. The end user system checks the keys and tells the user if a mistake has been made in entering them. Once valid keys have been entered, the unlocking step has been completed and a corresponding message is displayed to the user.

The user may then click on the Save button 454 if he wishes to wait until later to perform the installation of the unlocked items, or on the Install button 456 if he wishes to proceed immediately to installation.

Installing

Figure 22:
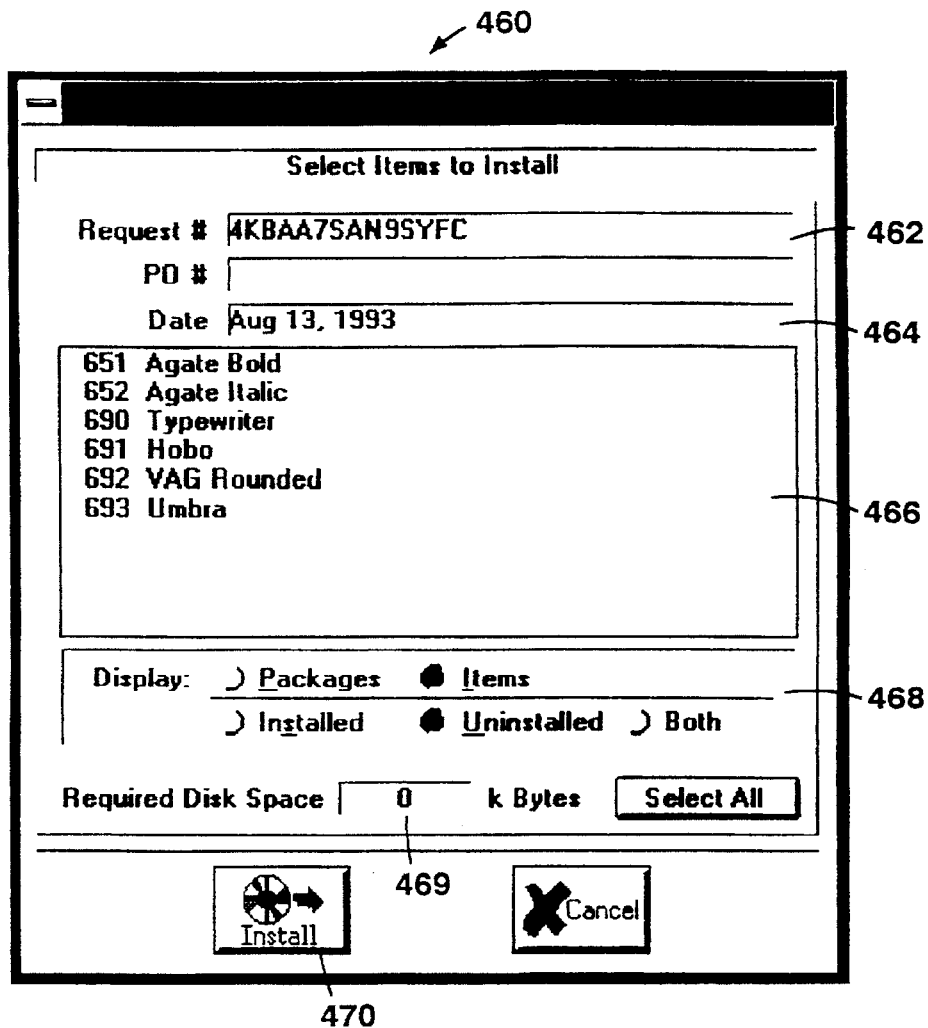

When the user indicates his wish to install the items of an unlocked order, the installation window 460 (FIG. 22) is presented. The installation window shows the request number 462 and date 464 of the order and lists 466, allows the user to control whether packages or items are displayed, and whether installed or uninstalled items or both are displayed 468. The user may select items or packages on the display and the system shows the required diskspace to install the displayed items 469.

When the display shows the items and packages which the user wishes to install, he clicks on the Install button 470.

Figure 23:
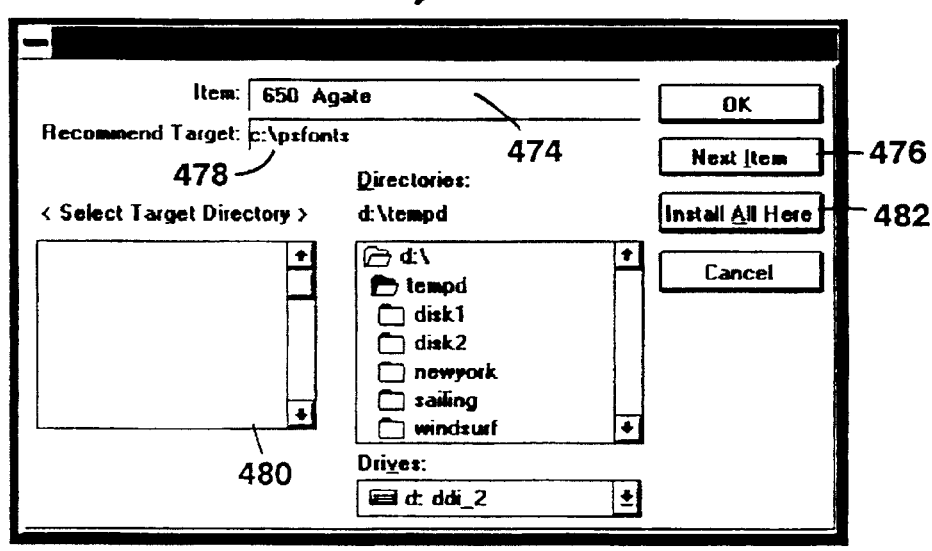

This leads to display of a control window 472 (FIG. 23). In window 472 the user may choose the location for storing each item in the order. The Next Item button 476 controls the contents of the Item box 474. A Recommended Target box 478 shows the recommended location as indicated in the CD-ROM database. The user indicates the actual directory desired in box 480 in the usual way for Windows applications. The Install All Here box allows the user to handle installation of all items to the same directory at once.

Installation of each item involves decryption using the decryption key for that item found in the decryption key file on the CD-ROM database, and decompression.

Alternatively it is possible to arrange for the unlocked items on the CD-ROM to be used directly with on-the-fly decryption and decompression if appropriate facilities are provided.

Other interfaces, not so heavily dependent on the mouse actions by the user, may also be provided.

End User Database

Appendix B (incorporated by reference) includes an example of a database structure for use in the end user database. The end user database is created and maintained on the user's computer with the aid of routines included in the end user system stored on the CD-ROM.

As seen Appendix B, the end user database includes information such as the customer's number, name, address, telephone numbers, credit card information, disk information, and order and key information.

Order Taking System

In order to generate keys for delivery to the end user in response to an order, the order taker is presented with a screen 490. A box 491 contains the unique request number associated with the order. This number may be obtained electronically over a telephone line or entered manually by the order taker when the request number is spoken to the order taker over the phone by the end user. The disk title and disk description boxes 492, 493, display information that is derived automatically by the order taking system from the request number.

Box 494 contains the list of items being ordered. In one implementation this information would be derived automatically over the telephone line as part of the order. In another, the user would read the list of items to the order taker who would then enter them by keyboard or by selection from a scrolled item list 495.

Once the order is completed, the order taker selects "Generate Keys" and the "keys" are computed and displayed in boxes 496 and 497. The two entries in boxes 496 and 497 together comprise the decryption key for the decryption key file discussed earlier. They are displayed as two "keys" for convenience in delivering them by voice. The keys could either be delivered electronically or by voice to the user.

The order taking database is derived from order taking information sent from the pre-mastering system (see FIG. 1) The order taking database includes tables for each revision. A table for a given revision includes a list of item numbers, the title of each item, the decryption key for each item, and optional information such as accounting information. The database also includes a section for each pressing of each revision. That section contains, for each pressing, the key that was used to encrypt the decryption key of a prior pressing.

Other embodiments are within the scope of the claims.

For example, the nomenclature of the discussion above has centered on a commercial implementation in which a publisher wishes to distribute items in exchange for payments associated with user orders. But the system is also useful for non-commercial applications, such as for internal use within a corporation to distribute information (e.g., marketing information, manuals, product specifications) to employees. Many organizations are beginning to use CD-ROMs for internal distribution of proprietary information such as architectural drawings, financial transaction histories, and CAD/CAM/CAE designs. In those contexts the "order" is not associated with a payment, and encryption may or may not be needed.

The arrangements for decryption may be varied. For example, the decryption keys for selected items may not be included in the item decryption key file 182. This will be indicated in the CD-ROM database. When an end user orders such an item, the order acceptance will include an individual decryption key for each ordered item.

Alternatively, a single encryption key may be used to encrypt all items in a title, and a single corresponding decryption key may be provided to decrypt all items.

Furthermore, a hybrid scheme could be used in which some items on a title (e.g., less valuable ones) are protected by a single encryption key while others are protected on a one key per item basis.

The medium in which the digital information is conveyed need not be CD-ROM but could be floppy disks, tape, magnetic-optical storage, ROM chips, flash-RAM chips, normal hard disks, and other high-capacity media that may be developed in the future.

Furthermore the digital information may be distributed by a non-storage medium, including computer network media and side-band broadcasting. In the latter case, for example, side-band information sent by TV network, cable networks, and syndicators to their affiliates could be used more extensively if the transmitter knew that only authorized affiliates would be able to decrypt the broadcast signal and extract the original information. Similarly, broadcast frequency or cable channels could be used to distribute secure information. The invention is likely to be applicable to other non-storage media not yet developed.

Appendix C contains source code for an implementation of the invention which may differ in some respects from the implementation described above. The code in Appendix C was built using the following tools: Borland C++ Version 3.1, Raima dbVista version 3.21, Blaise CPalette Library version 1.0, and Symantec Object Graphics Library version 1.01. In Appendix C, DDKEY.EXE is the executable for the order taker system; DD.EXE is the executable for the end user system; the pre-mastering system is embedded in DD.EXE; CRYPTIT.EXE and KEYIT.EXE are part of the pre-mastering process. A portion of the disclosure of this patent application contains material which is subject to copyright protection. The owner has no objection to facsimile reproduction by anyone of the patent application, as it appears in the Patent and Trademark Office patent file or records, but otherwise reserves all copyright rights whatsoever.

What is claimed is:

1. A method for controlling access to a subset of items arbitrarily selected from among a larger set of items of digital information, comprising encrypting said items belonging to said set using encryption keys, each of said items belonging to said set being encrypted using a corresponding one of said encryption keys, said corresponding one of said encryption keys being unique among said encryption keys used for encrypting said items belonging to said set, and providing a decryption key which permits decryption of said items belonging to said arbitrarily selected subset of items.

2. The method of claim 1 wherein said encryption keys are associated with corresponding decryption keys, and said method further comprises encrypting said decryption keys using a single global encryption key, said global decryption key being said decryption key which is independent of the composition of said arbitrarily selected subset.

3. The method of claim 1 further comprising generating a request for access to said items belonging to said subset, incorporating in said request a request encryption key based on information unique to said request, said request encryption key being associated with a corresponding request decryption key, encrypting said global decryption key in accordance with said request encryption key, and decrypting said global decryption key in accordance with said request decryption key.

4. The method of claim 3 wherein said request for access to said items comprises an order placed by a computer.

5. The method of claim 3 wherein said information unique to said request comprises information associated with said computer.

6. The method of claim 3 wherein said information unique to said request is based on randomized data.

7. The method of claim 3 wherein said information unique to said request is based on a serial number of a medium on which said digital information is stored.

8. The method of claim 1 wherein said encryption keys are associated with corresponding decryption keys, and said method further comprising recording said larger set of items on a high-capacity random access storage medium, and recording said decryption keys on said medium.

9. The method of claim 8 further comprising encrypting said decryption keys prior to recording on said medium.

10. A method for controlling access to a subset of items arbitrarily selected from among a larger set of items of digital information, comprising recording said larger set of items on a high-capacity storage medium, and encrypting said items belonging to said set using encryption keys, each of said items belonging to said set being encrypted using an encryption key which is unique among said items belonging to said set, said encryption keys being associated with corresponding decryption keys, and encrypting said decryption keys using a single global encryption key, said global encryption key being associated with a corresponding global decryption key, said global decryption key permitting decryption of said items belonging to said arbitrarily selected subset of items, recording said decryption keys on said medium, generating a request for access to said items belonging to said subset, incorporating in said request a request encryption key based on information unique to said request, said request encryption key being associated with a corresponding request decryption key, encrypting said global decryption key in accordance with said request encryption key, and decrypting said global decryption key in accordance with said request decryption key.

11. Apparatus for controlling access to a subset of items arbitrarily selected from among a larger set of items of digital information, comprising an encryption mechanism for encrypting said items belonging to said set using encryption keys, each of said items belonging to said set being encrypted using an encryption key which is unique among said items belonging to said set, and a decryption key provider for providing a decryption key permitting decryption of said items belonging to said arbitrarily selected subset of items.

12. A method for restricting use of decryption keys which are provided to a user for the purpose of allowing decryption of information stored on a high-capacity storage medium, comprising, encrypting the respective decryption keys using respectively different encryption keys, providing the decryption keys to the user, and enabling the user to decrypt the respective decryption keys using the respective encryption keys.

13. The method of claim 12 wherein said encryption keys are generated based on information unique to a computer on which sid information is to be used.

14. The method of claim 12 wherein said encryption keys are generated based on randomized information.

15. The method of claim 12 wherein said information unique to said computer comprises a network address.

16. The method of claim 12 wherein said information unique to said computer comprises a computer serial number.

17. The method of claim 12 wherein said information unique to said computer comprises a disk serial number.

18. The method of claim 12 wherein said information which is unique to a single computer is delivered, from said computer to a location where said encrypting is done, as part of a request for access to said encrypted information.

19. A method for enabling a publisher to control access to digital information items distributed to users in the form of successive revisions of a high-capacity random access storage medium, comprising encrypting said digital information items as distributed on said high-capacity random access storage medium, giving a user access to selected ones of said items by providing decryption information for decrypting said selected items, storing information indicative of items to which users had been given access in earlier revisions of said medium, and enabling a user automatically to have access to items in a later revision of said medium if said user had access to said items in an earlier revision.

20. A method for controlling access to items of digital information stored on a high capacity storage medium, comprising encrypting one group of said items by a mechanism which enables decryption based on a single decryption key not recorded on said medium, and encrypting another group of said items by a mechanism which requires different decryption keys, not recorded on said medium, for each of said other items.

21. The method of claim 20 further comprising storing information on said medium which indicates which of said items belong to which of said groups.

* * * * *